Feb. 3. 1925.
W. B. UNDERWOOD
1,524,764
HANDLE FOR VALVES, SHAFTS, OR THE LIKE
Filed Aug. 21, 1924
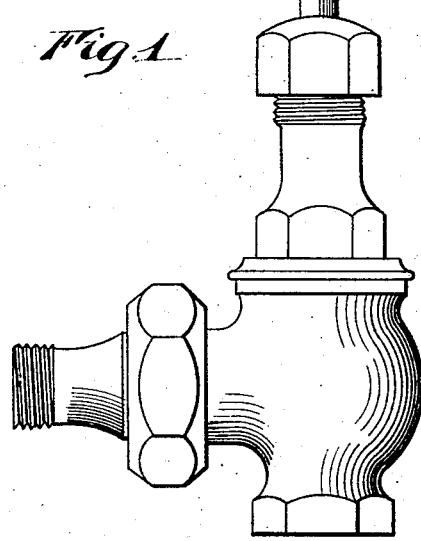
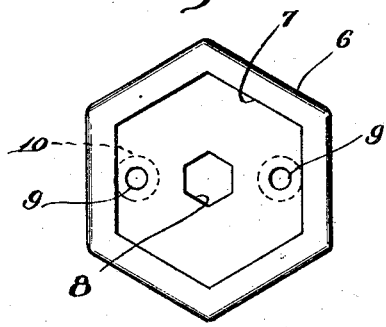
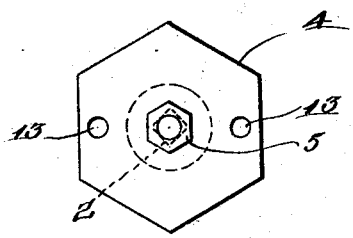
INVENTOR.
Weeden B. Underwood.
BY Davis & Simms
his ATTORNEYS.

Patented Feb. 3, 1925.

1,524,764

UNITED STATES PATENT OFFICE.

WEEDEN B. UNDERWOOD, OF ROCHESTER, NEW YORK, ASSIGNOR TO WILMOT CASTLE COMPANY, OF ROCHESTER, NEW YORK, A CORPORATION OF NEW YORK.

HANDLE FOR VALVES, SHAFTS, OR THE LIKE.

Application filed August 21, 1924. Serial No. 733,400.

*To all whom it may concern:*

Be it known that I, WEEDEN B. UNDERWOOD, a citizen of the United States, and resident of Rochester, in the county of Monroe and State of New York, have invented certain new and useful Improvements in Handles for Valves, Shafts, or the like, of which the following is a specification.

The present invention relates to handles for valves, shafts or the like, and an object thereof is to secure to the valve stem or shaft a handle in such a manner that the nut which fastens the handle in place is locked against turning and is, at the same time, covered so that it does not present an unsightly appearance. A further object of the invention is to provide a handle for valves or the like having a grip member made of material which cannot be conveniently secured directly to the valve stem or shaft and which acts as a nut lock for the nut which secures the handle to the valve stem or shaft.

To these and other ends, the invention consists of certain parts and combinations of parts, all of which will be hereinafter described; the novel features being pointed out in the appended claims.

In the drawings:

Fig. 1 is a vertical section through a handle constructed in accordance with this invention;

Fig. 2 is a view of the underside of the grip portion of the handle; and

Fig. 3 is a top view of the anchoring portion of the handle secured to the stem or shaft.

Referring more particularly to the illustrated embodiment of the invention, 1 indicates the valve stem or other shaft which has a polygonally formed portion 2 near one end and a screw threaded portion 3 beyond said polygonally formed portion. On the polygonally formed portion an anchoring portion 4 is fitted which has a central opening conforming to the polygonally formed portion 2. This anchoring portion is held to the stem or shaft by a nut 5 secured on the screw threaded portion.

Fitted to the anchoring portion 4 is a grip portion 6 preferably made of bakelite or other material which does not lend itself readily to being secured directly to the shaft and which, in this instance, acts as a non-conductor of heat and electricity. This member has a pocket 7 in its underside with a contour conforming to the perimeter of the anchoring member 4 and preferably non-circular so that a turning between the two parts cannot take place. This grip portion also has a pocket 8 within the pocket 7 for receiving the nut 5, the contour of this pocket being polygonal to conform to the perimeter of the nut 5, thereby acting to hold the nut against turning on the stem 1.

To secure the grip portion to the anchoring portion 4, the latter has two bolt openings 9 counter-sunk at 10 to receive the heads 11 of the bolts 12, the bolts being extended through the bolt opening and being anchored in the anchoring member 4 which has screw threaded openings 13 to receive such bolts.

From the foregoing it will be seen that there has been provided a handle for valve stems, shafts or the like in which there is a grip portion secured to an anchoring portion which is held to the shaft or stem by a nut, the grip portion having such engagement with the nut as to prevent the turning of the latter on the shaft and such grip portion also being secured to the anchoring portion against turning. This arrangement makes it possible to make the grip portion of a material which will ornament the handle and render it a non-conductor to heat and electricity without any danger of the grip portion being accidentally disconnected from the shaft.

What I claim as my invention and desire to secure by Letters Patent is:

1. In combination with a shaft, a handle for turning the same embodying an anchoring member secured to the shaft, a nut secured to the anchoring member, and a grip portion secured to the anchoring member and engaging the nut to prevent the turning of the latter relatively to the shaft.

2. In combination with a shaft having a non-circular portion and a screw threaded portion beyond the non-circular portion, an anchoring member fitted to the non-circular portion, a nut secured to the screw threaded portion and holding the anchoring portion to the shaft, and a grip portion secured to the anchoring portion and engaging the nut to hold the latter against turning.

3. In combination with a shaft, an anchoring portion secured to the shaft and having a non-circular perimeter, a nut secured to the shaft and holding the anchoring portion to the shaft, a grip portion having a pocket receiving the anchoring portion, and a pocket receiving the nut, and means for anchoring the grip portion to the anchoring portion.

WEEDEN B. UNDERWOOD.